United States Patent
Toussi (10) Patent No.: US 10,926,850 B2
(45) Date of Patent: Feb. 23, 2021

(54) VENTILATED LIFE JACKET

(71) Applicant: Afshin Toussi, Saint Johns, FL (US)

(72) Inventor: Afshin Toussi, Saint Johns, FL (US)

(73) Assignee: DATREX INC., Kinder, LA (US)

(*) Notice: Subject to any disclaimer, the term of this patent is extended or adjusted under 35 U.S.C. 154(b) by 183 days.

(21) Appl. No.: 16/167,272

(22) Filed: Oct. 22, 2018

(65) Prior Publication Data

US 2019/0118914 A1    Apr. 25, 2019

Related U.S. Application Data

(63) Continuation-in-part of application No. 29/626,810, filed on Nov. 20, 2017.

(60) Provisional application No. 62/574,847, filed on Oct. 20, 2017.

(51) Int. Cl.
| | |
|---|---|
| *B63C 9/115* | (2006.01) |
| *B32B 7/08* | (2019.01) |
| *B32B 5/18* | (2006.01) |
| *B32B 3/18* | (2006.01) |

(52) U.S. Cl.
CPC ............... *B63C 9/115* (2013.01); *B32B 3/18* (2013.01); *B32B 5/18* (2013.01); *B32B 7/08* (2013.01); *B32B 2307/724* (2013.01)

(58) Field of Classification Search
CPC .......... B63C 9/08; B63C 9/087; B63C 9/093; B63C 9/11; B63C 9/115; A41D 7/001; A41D 13/0125
See application file for complete search history.

(56) References Cited

U.S. PATENT DOCUMENTS

| | | | | |
|---|---|---|---|---|
| 2,363,640 A | * | 11/1944 | Brown | B63C 9/115 441/115 |
| 2,629,118 A | * | 2/1953 | Frieder | B63C 9/115 441/110 |
| 2,976,539 A | * | 3/1961 | Brown, Jr. | A41D 3/00 2/93 |
| 3,398,406 A | * | 8/1968 | Waterbury | F41H 5/023 2/2.5 |
| 3,400,415 A | * | 9/1968 | Scheurer | B63C 9/115 441/112 |
| 4,181,993 A | * | 1/1980 | McDaniel | B63C 9/125 441/108 |
| 4,380,441 A | * | 4/1983 | Harr | B63C 9/115 441/112 |
| 4,551,107 A | * | 11/1985 | Scheurer | B63C 9/115 441/112 |

(Continued)

*Primary Examiner* — Ajay Vasudeva (57) ABSTRACT

A ventilated life jacket is an apparatus that facilitates airflow through the vest. The apparatus includes a vest, a first buoyant foam layer, a second buoyant foam layer, at least one first ventilation track, at least one second ventilation track, and a plurality of harnesses. The vest further includes a first panel and a second panel. The first panel houses the first buoyant foam layer. Similarly, the second panel houses the second buoyant foam layer. The at least one first ventilation track and the at least one second ventilation track traverses through and across the first buoyant foam layer and the second buoyant foam layer, respectively, for increased airflow. The plurality of harnesses secures the vest around a user. The at least one first ventilation track and the at least one second ventilation track may be a series of holes or a continuous slot.

16 Claims, 9 Drawing Sheets

(56) References Cited

U.S. PATENT DOCUMENTS

| | | | | |
|---|---|---|---|---|
| 6,138,277 A | * | 10/2000 | Gillen | A41D 13/015 2/102 |
| 6,910,224 B2 | * | 6/2005 | Ikenaga | A41D 13/0125 2/102 |
| 7,331,836 B1 | * | 2/2008 | Harris | B63C 9/115 441/106 |
| 2007/0062638 A1 | * | 3/2007 | Carroll | B32B 5/18 156/290 |
| 2008/0188149 A1 | * | 8/2008 | Curry | B63C 9/1255 441/88 |

* cited by examiner

VENTILATED LIFE JACKET

The current application is a continuation-in-part (CIP) application of the U.S. design application Ser. No. 29/626,810 filed on Nov. 20, 2017.

The current application also claims a priority to a U.S. provisional application Ser. No. 62/574,847 filed on Oct. 20, 2017. The current application is filed on Oct. 22, 2018 while Oct. 20, 2018 was on a weekend.

FIELD OF THE INVENTION

The present invention generally relates to life jackets More specifically, the present invention is a ventilated life jacket that allows for more mobility for a user.

BACKGROUND OF THE INVENTION

Inherently buoyant life jackets are manufactured by using fabric, webbing, and foam. Typically foam surrounds the frontside and backside of the torso and is held in place by fabric and webbing. The front, left, and right foam lobes are larger in size than the back piece to offset the balance. Thicker foam pieces in front of life jackets enhances the buoyancy by turning the face up to reduce the risk of drowning.

Thick layers of foam against a torso acts as insulation too. This insulation however can be uncomfortable, especially for long periods of time and while in diverse maritime environment. Any interruption in foam can be beneficial and improve the breathability of the lifejacket against the torso, especially in warmer or humid climates.

Previous attempts to increase breathability of life jackets has been executed by removing large areas of foam, creating empty spaces within the foam. The empty spaces within the foam are typically replaced with mesh fabric in order to preserve the structure and strength of the lifejacket. This method has been sufficient for recreational kayaking and canoeing life jackets.

Though the compartmentation of empty spaces among buoyant foam creates some breathability, the breathability is limited. In addition to limited breathability, the compartmentation of empty spaces compromise buoyancy and add bulk to the overall life jacket. In order to gain more buoyancy, and therefore meet the minimum requirements, the foam must be thick enough to compensate for the removed floatation areas. Another disadvantage of this method is that the breathable areas are not as effective. This is because of the thickness of surrounding foam pieces closes more of the area that was left open within the life jacket. Another disadvantage to this approach is that the ventilation is somewhat random without continuity and with limited effect. Another disadvantage is that this type of construction is more expensive due to smaller pieces, more material, and more labor involved in creating various voided spaces or isolated vents within the life jacket. Current ventilation is typically seen only on higher end jackets such as the ones designed for kayaking and canoeing.

It is therefore an objective of the present invention to provide a simple and cost sensitive solution that resolves and addresses two comfort features, heat dissipation and wearable comfort. Typically, lifejacket foam comprises two types of foam, polyethylene and PVC foam. Polyethylene traditionally is used in a layered configuration, and PVC is in a single layer configuration. For the present invention, both types of foam may also be incorporated into the life jacket.

An uninterrupted and offset ventilation pattern creates an open space with a minimal sacrifice of buoyancy and waste. Another benefit is that the space created by this ventilation pattern acts as a wide hinge that gives the user more mobility, allowing the user to move freely with comfort. These two features are of great benefit for life jackets that are specially used for workers that must wear a life jacket during their work, whereas typical life jackets cause discomfort in hot and humid environments.

DETAIL DESCRIPTIONS OF THE INVENTION

All illustrations of the drawings are for the purpose of describing selected versions of the present invention and are not intended to limit the scope of the present invention.

The present invention is a ventilated life jacket with improved ventilation and increased mobility. The present invention maintains the necessary ventilation while maximizing buoyancy. In order to provide ventilation, buoyancy, and comfort, the present invention comprises a vest 1, a first buoyant foam layer 13, a second buoyant foam layer 14, at least one first ventilation track 22, at least one second ventilation track 23, and a plurality of harnesses 28, seen in FIG. 1, FIG. 2, FIG. 5, and FIG. 6. The vest 1 attaches the first buoyant foam layer 13 and the second buoyant foam layer 14 to a user. In order to house the first buoyant foam layer 13 and the second buoyant foam layer 14 within vest 1, the vest 1 comprises a first panel 2 and a second panel 3. Moreover, the first panel 2 and the second panel 3 each comprises an inner layer 4 and an outer layer 5. The inner layer 4 is preferably made of mesh material, and the outer layer 5 is preferably made of nylon material. The inner layer 4 secures the first buoyant foam layer 13 and the second buoyant foam layer 14 within the first panel 2 and the second panel 3, respectively, while maintain ventilation throughout the vest 1. The outer layer also secures the first buoyant foam layer 13 and the second buoyant foam layer 14, respectively, while protecting the first buoyant foam layer 13 and the second buoyant foam layer 14 from surrounding elements. The first buoyant foam layer 13 and the second buoyant foam layer 14 suspends the user above water level. The first buoyant foam layer 13 and the second buoyant foam layer 14 are preferably made of polyethylene. In alternate embodiments of the present invention, the first buoyant foam layer 13 and the second buoyant foam layer 14 are made of polyvinyl chloride (PVC) foam. The at least one first ventilation track 22 and the at least one second ventilation track 23 facilitates airflow to the torso of a user that is typically suffocated by the vest 1, the first buoyant foam layer 13, and the second buoyant foam layer 14. The plurality of harnesses 28 secures the vest 1 to the user, specifically around the midsection of the user.

Figure 1:
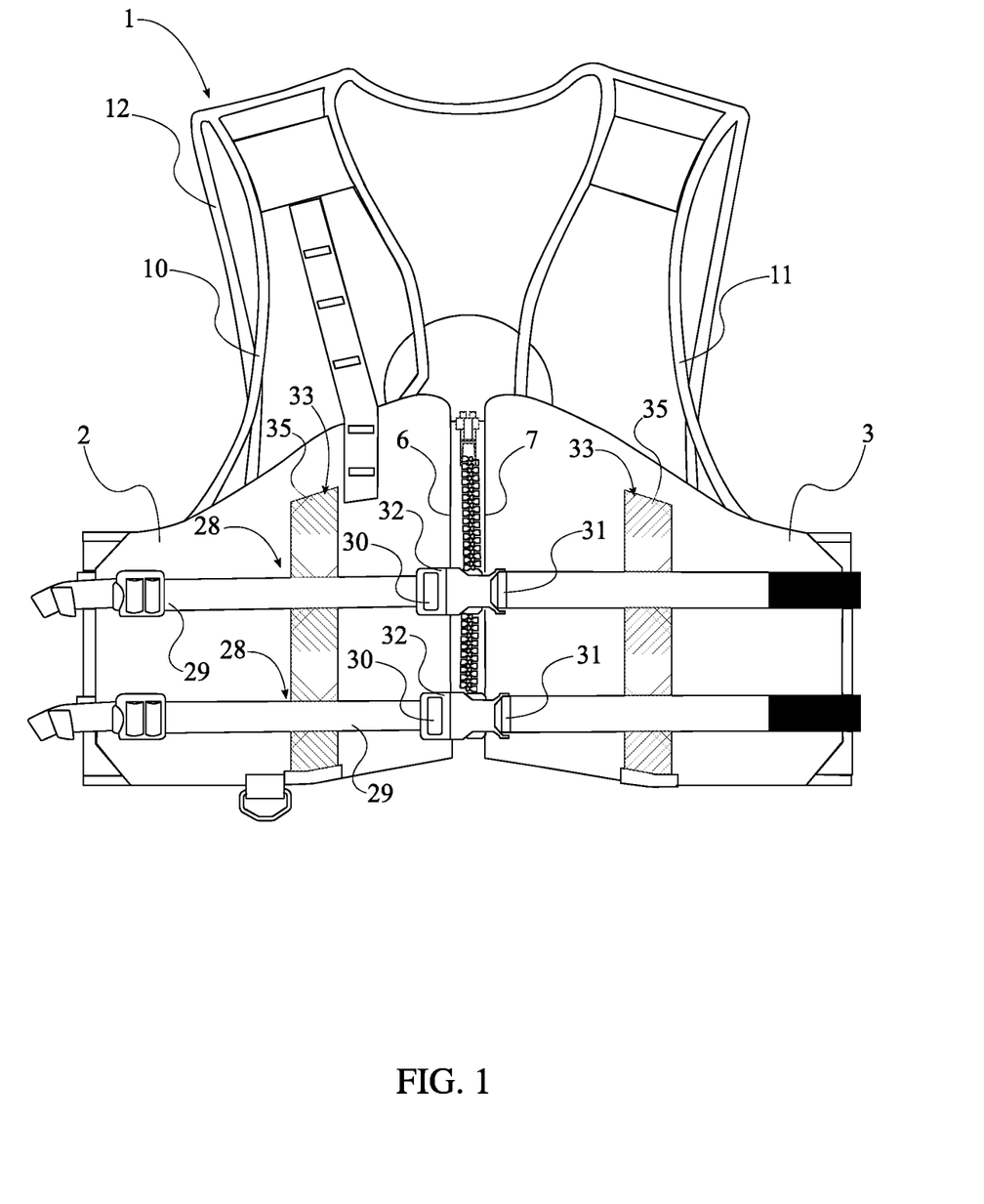
FIG. 1 is a front side view of the present invention with at least one ventilation slit.

The overall configuration of the aforementioned components safely attaches the first buoyant foam layer 13 and the second buoyant foam layer 14 to a user while submerged in water. As seen in FIG. 1 an FIG. 2, the first panel 2 is terminally positioned adjacent to a first lateral edge 6 of the vest 1. Similarly, the second panel 3 is positioned adjacent a second lateral edge 7 of the vest 1, opposite the first panel 2. This arrangement positions the first buoyant foam layer 13 and the second buoyant foam layer 14 against the front of the user, specifically the torso and lower chest of the user, seen in FIG. 5 and FIG. 6. Moreover, the positioning of the first buoyant foam layer 13 and the second buoyant foam layer 14 against the torso and lower chest of the user orients the user in an upright position while submerged in water, with the upper body above the water line. In order to house and secure the position of the first buoyant foam layer 13 and the second buoyant foam layer 14 within the vest 1, the inner layer 4 traverses across the outer layer 5 and is perimetrically connected to the outer layer 5. More specifically, the first buoyant foam layer 13 is positioned within the first panel 2, between the inner layer 4 and the outer layer 5. Similarly, the second buoyant layer is positioned within the second panel 3, between the inner layer 4 and the outer layer 5. The vest 1 wraps around the body of the user is secured to the user as the first lateral edge 6 is removably attached to the second lateral edge 7 with the plurality of harnesses 28. Due to the confinement of the midsection of the user by the vest 1, the at least one first ventilation track 22 traverses through and across the first buoyant foam layer 13, and the at least one second ventilation track 23 traverses through and across the second buoyant foam layer 14.

In the present invention, the first buoyant foam layer 13 and the second buoyant foam layer 14 accommodates movements of the user while simultaneously ventilating the midsection of the user. As seen in FIG. 5, FIG. 6, FIG. 7, FIG. 8, and FIG. 9, the at least one first ventilation track 22 and the at least one second ventilation track 23 comprises a plurality of first holes 24 and a plurality of second holes 25, facilitating airflow and preserving the structural integrity of the first buoyant foam layer 13 and the second buoyant foam layer 14, respectively. Moreover, the first buoyant foam layer 13 and the second buoyant foam layer 14 each comprises a first portion 15 and a second portion 17, seen in FIG. 6, FIG. 7, and FIG. 8. The first portion 15 and the second portion 17 uplift the user above the water level and provides increased mobility for the user. In order to preserve the buoyancy of both the first buoyant foam layer 13 and the second buoyant foam layer 14, a first edge 16 of the first portion 15 is positioned adjacent a second edge 18 of the second portion 17, and the second edge 18 traverses along the first edge 16. The plurality of first holes 24 traverses through the first portion 15 and is distributed across the first edge 16. Similarly, the plurality of second holes 25 traverses through the second portion 17 and is distributed across the second edge 18.

Figure 5:
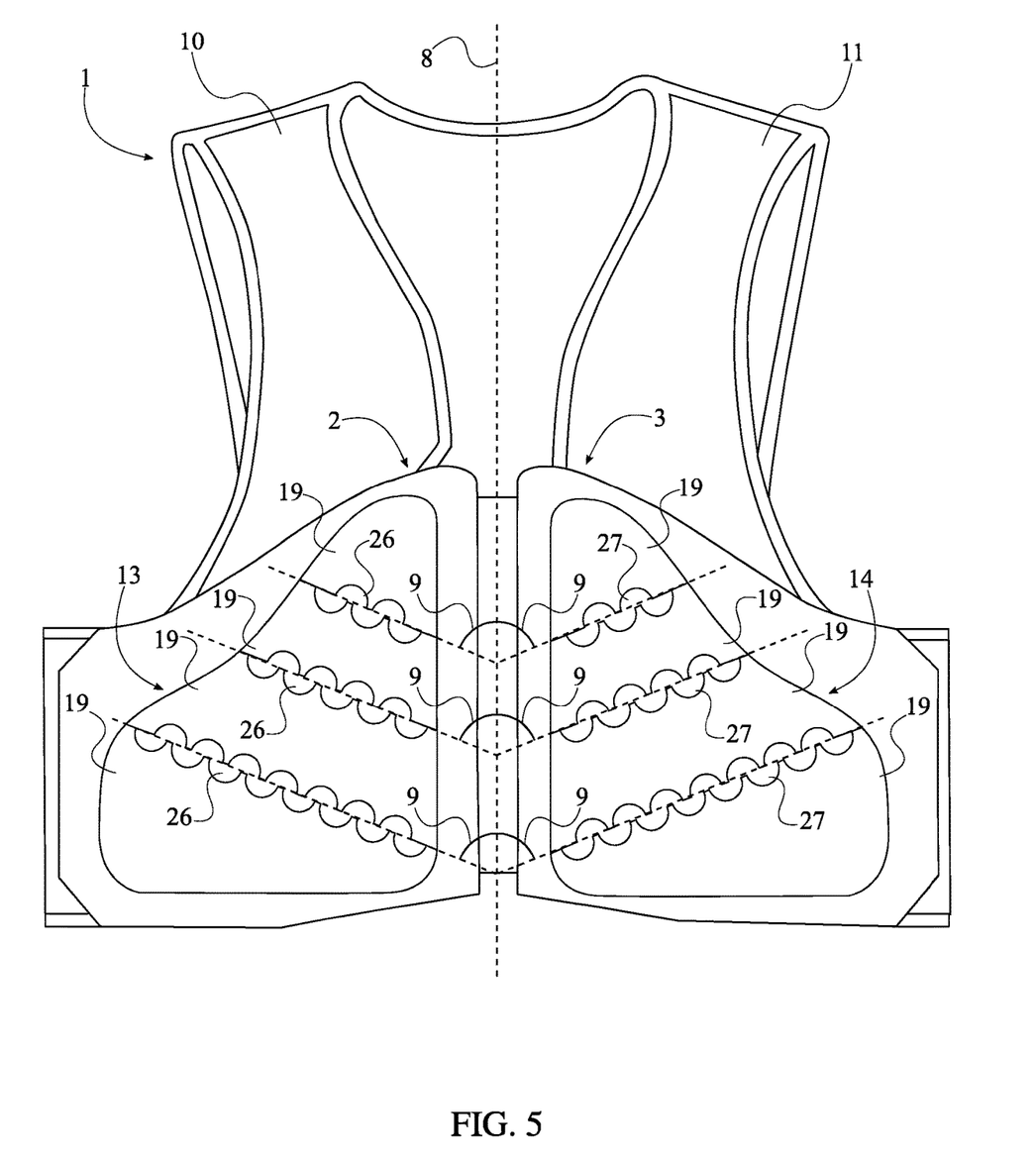
FIG. 5 is a schematic view of a first buoyant foam layer, the second buoyant foam layer, and the vest with at least one first ventilation track and at least one second ventilation track oriented at an acute angle with the vest of the present invention.
Figure 6:
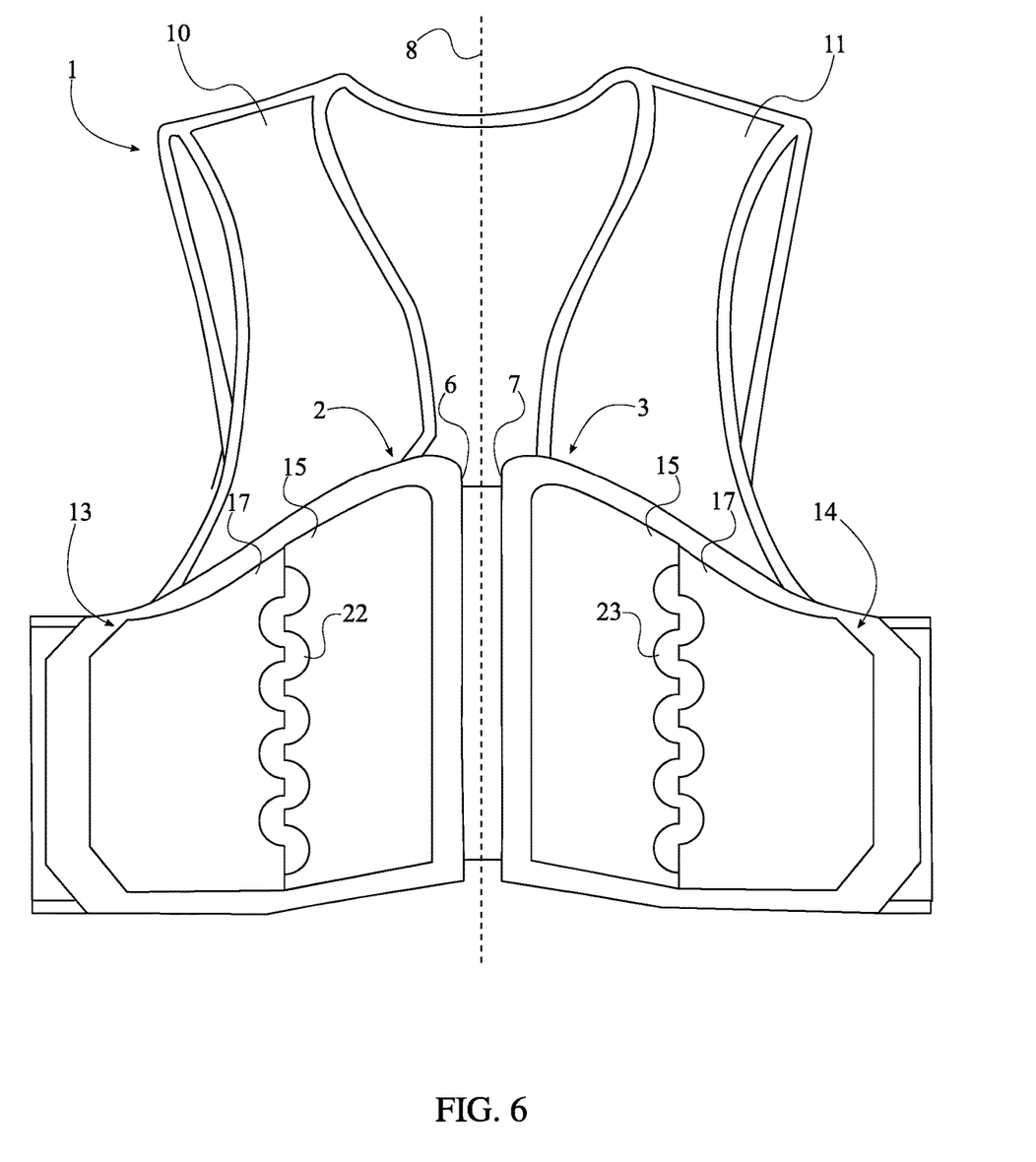
FIG. 6 is a schematic view of a first buoyant foam layer, the second buoyant foam layer, and the vest with at least one first ventilation track and at least one second ventilation track oriented parallel with the vest of the present invention.
Figure 7:
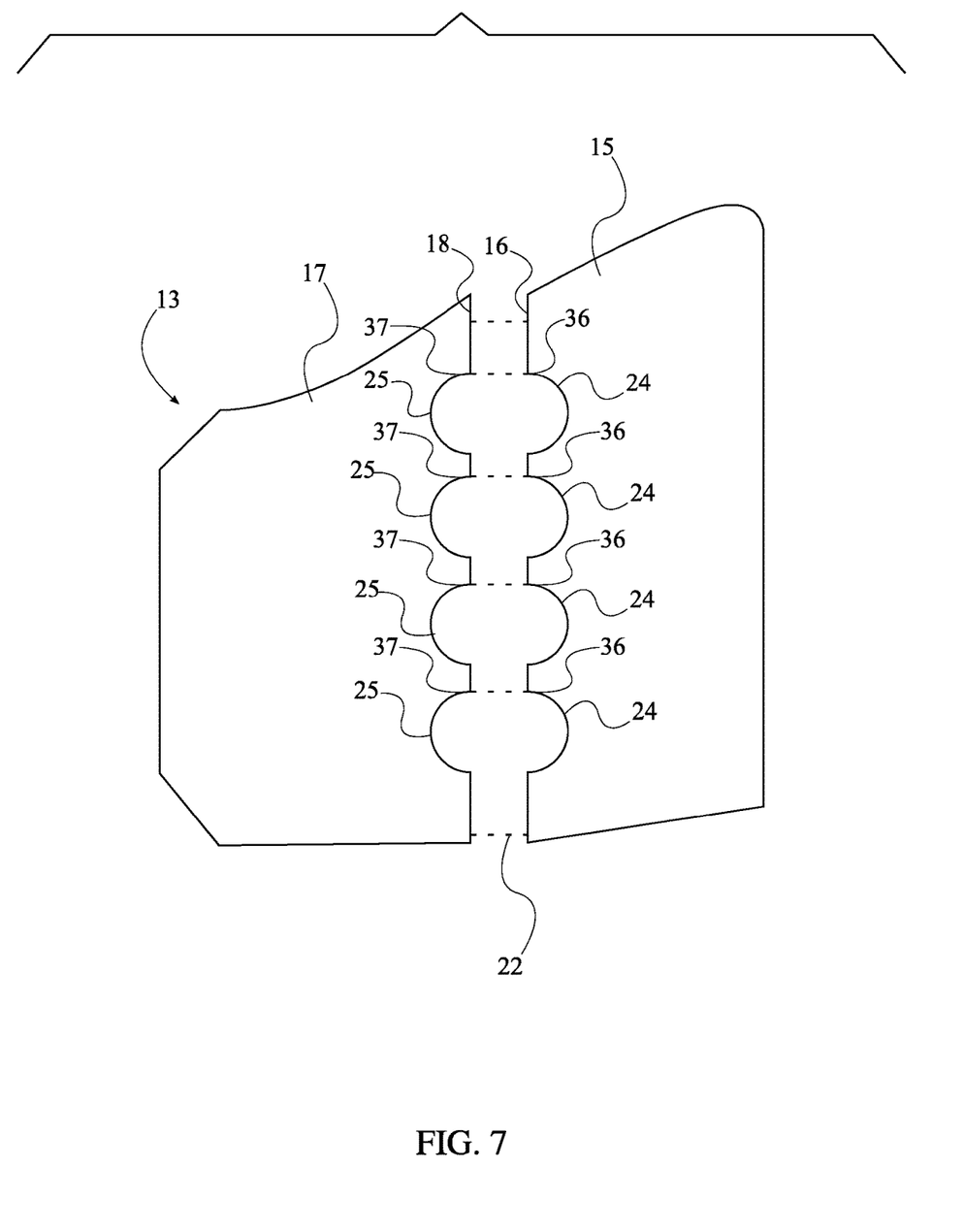
FIG. 7 is a schematic view of a first portion and a second portion for the first buoyant foam layer of the present invention with each of the plurality of first holes aligned with a corresponding hole of the plurality of second holes.
Figure 8:
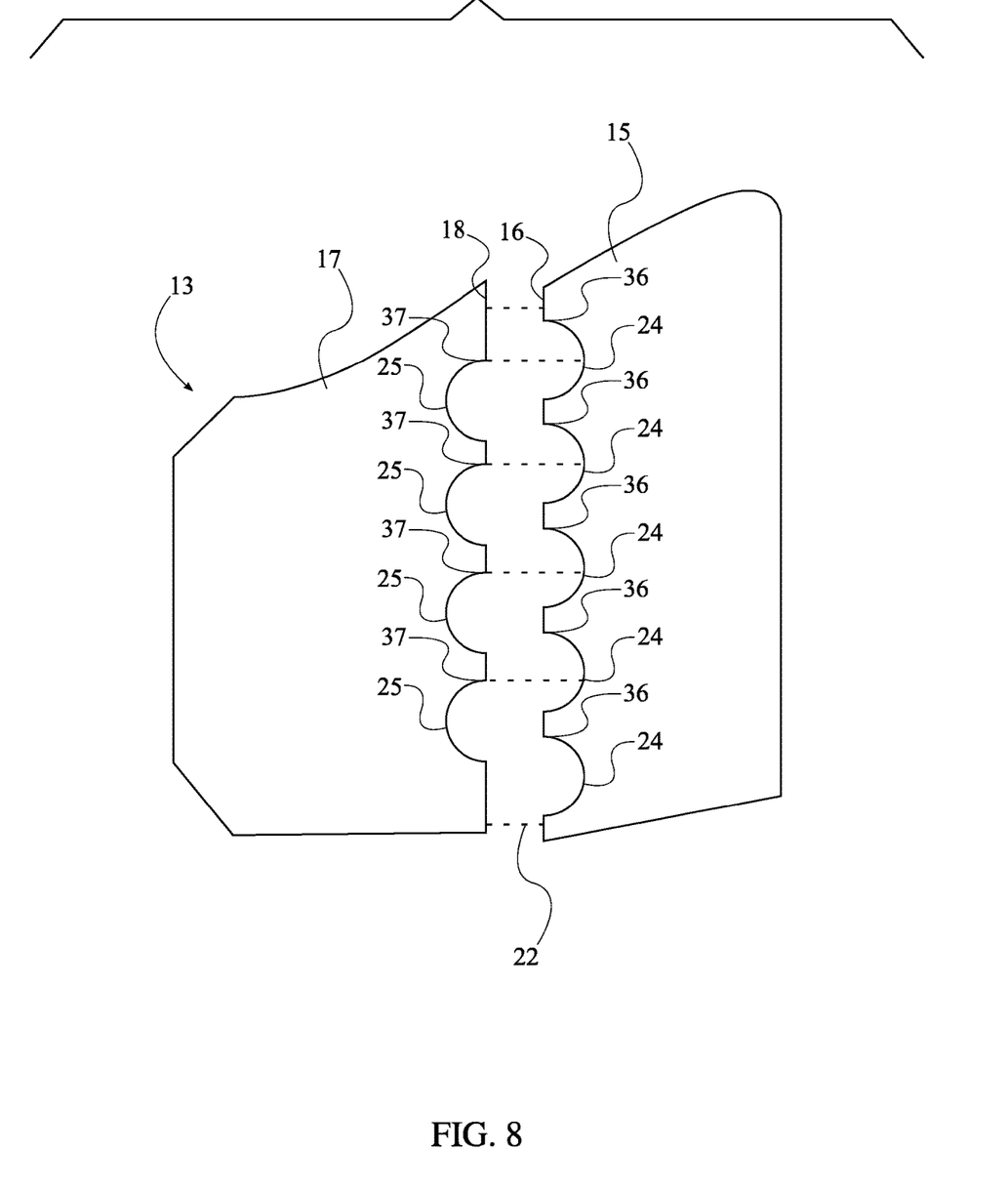
FIG. 8 is a schematic view of a first portion and a second portion for the first buoyant foam layer of the present invention with each of the plurality of first holes offset with a corresponding hole of the plurality of second holes.

In a first embodiment of the present invention, each of the plurality of first holes 24 is aligned with a corresponding hole of the plurality of second holes 25, seen in FIG. 7. In this first embodiment of the present invention, each of the plurality of first holes 24 and each of the corresponding plurality of second holes 25, together, defines a series of holes along the first edge 16 of the first portion 15 and the second edge 18 of the second portion 17. The series of holes provide more rigidity for the first buoyant foam layer 13 and the second buoyant foam layer 14, respectively, while facilitating airflow through the series of holes. The series of holes are preferably circular. In a second embodiment of the present invention, a first end 36 of each of the plurality of first holes 24 is offset with a first end 37 of a corresponding hole of the plurality of second holes 25, seen in FIG. 8. In this second embodiment of the present invention, the plurality of first holes 24 and the plurality of second holes 25 together define a continuous slot across the first edge 16 of the first portion 15 and the second edge 18 of the second portion 17. Moreover, as seen in FIG. 5 and FIG. 6, the continuous slot comprises a curved path defined by the plurality of first holes 24 and the plurality of second holes 25. The continuous slot provides increased airflow and more mobility for the user.

Both the first embodiment of the present invention and the second embodiment of the present invention may be arranged to allow for more vertical movement and for more lateral movement of the user. In a third embodiment of the present invention, the first edge 16 is oriented at an acute angle 9 with an acute angle 9 with a sagittal plane 8 of the vest 1, seen in FIG. 2, FIG. 4, FIG. 5, and FIG. 9. This third embodiment accommodates vertical movements of the user, such as bending upwards and downwards. In a fourth embodiment of the present invention, the first edge 16 is oriented parallel with a sagittal plane 8 of the vest 1, seen in FIG. 1, FIG. 3, FIG. 6, FIG. 7, and FIG. 8. The fourth embodiment accommodates lateral movements of the user, such as twisting left and twisting right.

Figure 9:
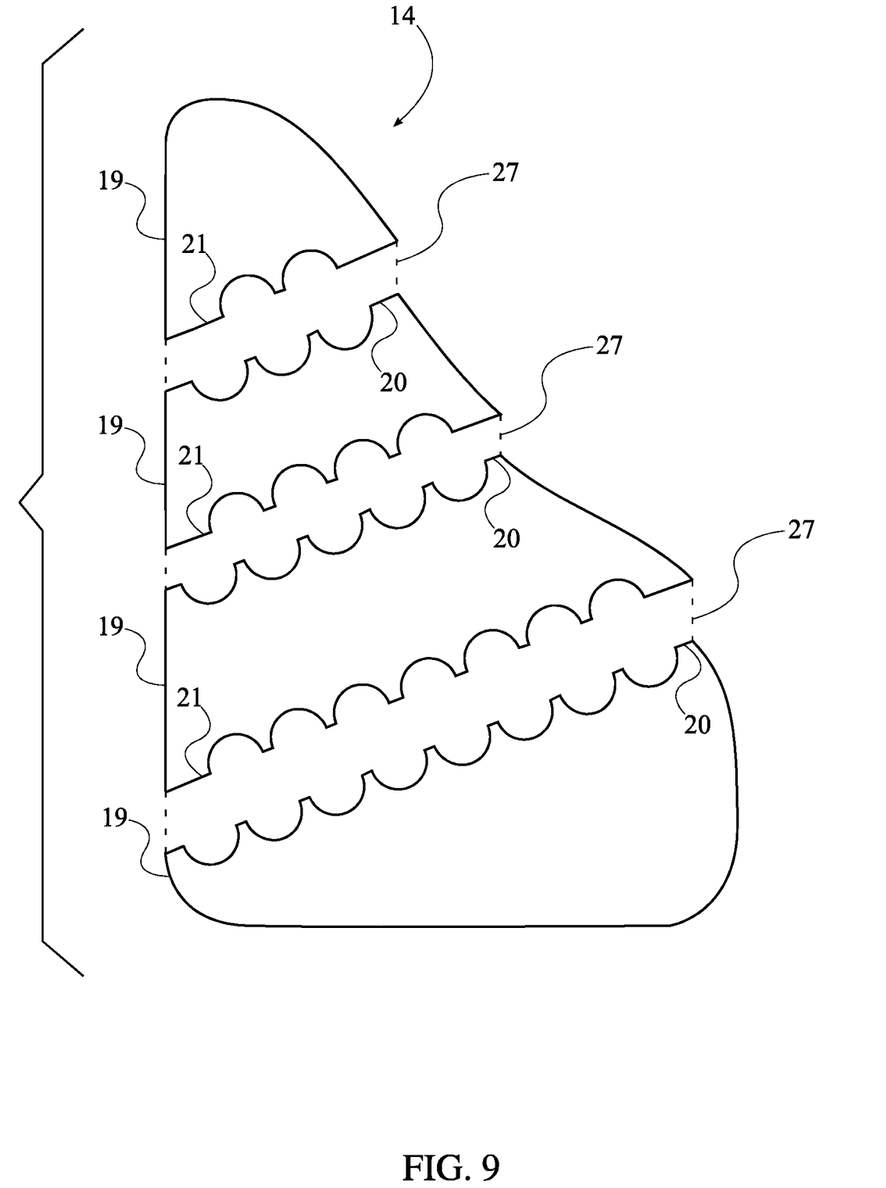
FIG. 9 is a schematic view of a plurality of portions for the first buoyant foam layer of the present invention.

In alternate embodiments of the present invention, in order to increase both ventilation for the vest 1 and mobility for the user, the first buoyant foam layer 13 comprises a plurality of portions 19, shown in FIG. 5 and FIG. 9. Furthermore, the at least one first ventilation track 22 is a plurality of first ventilation tracks. Each ventilation track of the plurality of first ventilation tracks traverses through a portion and an adjacent portion of the plurality of portions 19. Each ventilation track of the plurality of first ventilation tracks traverses along a first edge 20 of a portion and a second edge 21 of an adjacent portion of the plurality of portions 19. More specifically, the plurality of first ventilation tracks is oriented parallel with each other, preserving the structural integrity of the first buoyant foam layer 13. Similarly, the second buoyant foam layer 14 comprises a plurality of portions 19, and the at least one second ventilation track 23 is a plurality of second ventilation tracks. Each ventilation track of the plurality of second ventilation tracks traverses through a portion and an adjacent portion of the plurality of portions 19. Each ventilation track of the plurality of second ventilation tracks traverses along a first edge 20 of a portion and a second edge 21 of an adjacent portion of the plurality of portions 19. More specifically, the plurality of second ventilation tracks is oriented parallel.

In order for the vest 1 to safely maintain a user above water level in a variety of environments, the vest 1 further comprise a first shoulder strap 10, a second shoulder strap 11, and a back panel 12, as shown in FIG. 1, FIG. 2, FIG. 5, and FIG. 6. The first shoulder strap 10 and the second shoulder strap 11 rest on the shoulders of the user and connect the first panel 2 and the second panel 3 to the back panel 12. The back panel 12 wraps and surrounds the vest 1 around the user. The back panel 12 also laterally connects the first panel 2 with the second panel 3. Alternate embodiments of the present invention may further comprise pockets, fasteners, and a variety of essential life jacket accessories. In order to secure the vest 1 around the user, each harness comprises a belt 29 and a fastener 32. The back panel 12 is positioned in between the first shoulder strap 10 and the second shoulder strap 11 and is terminally fixed to the first shoulder strap 10 and the second shoulder strap 11. Moreover, the first panel 2 is fixed to the first shoulder strap 10, opposite the back panel 12. Similarly, the second panel 3 is fixed to the second shoulder strap 11, opposite the back panel 12. The first panel 2 and the second panel 3 remain wrapped around the torso of the user as the belt 29 traverses across the first panel 2 and the second panel 3. In alternate embodiments of the present invention, the belt 29 traverses across the first panel 2, the second panel 3, and the back panel 12 in order to further secure the vest around the torso of the user. A fixed end 30 of the belt 29 is connected across the first panel 2, adjacent the first lateral edge 6 of the vest 1, and a free end 31 of the belt 29 is fixed to the second panel 3, adjacent the second lateral edge 7 of the vest 1. The fixed end 30 of the belt 29 is engaged to the free end 31 of the belt 29 with the fastener 32. This arrangement allows the belt 29 to be length-adjustable and effectively secures the vest 1 around the user.

In alternate embodiments of the present invention, the first panel 2 and the second panel 3 may each be laterally fixed to the back panel 12 with a first lateral strap and a second lateral strap, respectively, as seen in FIG. 1, FIG. 5, and FIG. 6. The first lateral strap is fixed between the first panel 2 and the back panel 12, and the second lateral strap is fixed between the second panel 3 and the back panel 12. This arrangement further ensures the position of the first panel 2, the second panel 3, and the back panel 12, around the torso of the user.

Further ventilation is provided as the preferred embodiment of the present invention further comprises at least one ventilation slit 33 and a mesh layer 35, seen in FIG. 1, FIG. 2, FIG. 3, and FIG. 4. The at least one ventilation slit 33 provides a direct path of airflow through the vest 1 and the mesh layer 35 encloses the first buoyant foam layer 14 within the first panel 2 while preserving the direct path of airflow into the vest 1. In order to define a direct path of airflow, the at least one ventilation slit 33 traverses through the outer layer 5 of the first panel 2 and across the at least one first ventilation track 22, seen in FIG. 1. The first buoyant foam layer is not displaced within the first panel 2 and through the at least one ventilation slit 33, as the mesh layer 35 is positioned adjacent the at least one ventilation slit 33, between the outer layer 5 and the first buoyant foam layer 13. More specifically, the mesh layer 35 traverses across the at least one ventilation slit 33 and is perimetrically connected around the at least one ventilation slit 33.

Figure 2:
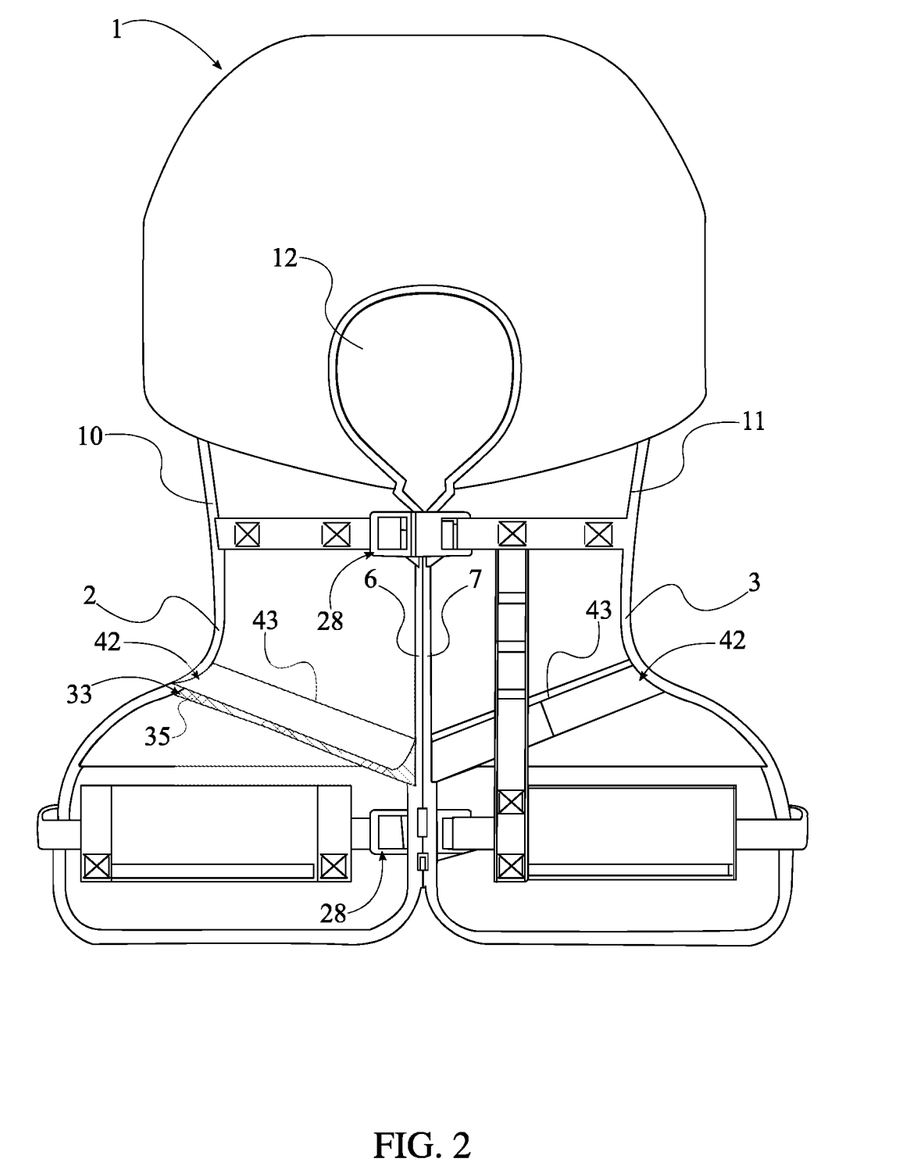
FIG. 2 is a front side view of the present invention with at least one ventilation slit and at least one elongated flap.
Figure 4:
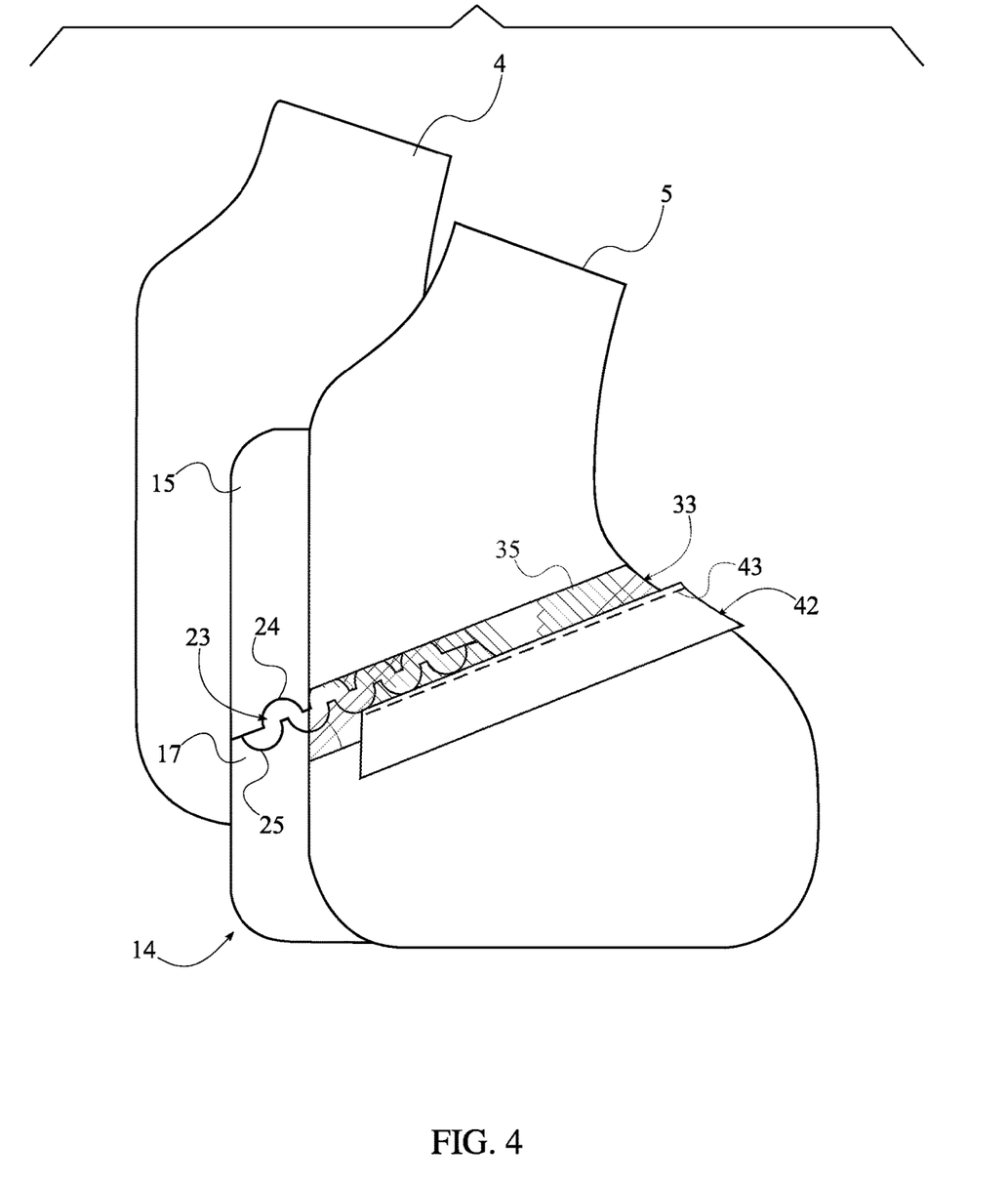
FIG. 4 is an exploded view of the panel and the second buoyant foam layer with at least one second ventilation track oriented at an acute angle with the sagittal plane of the vest of the present invention.

Alternate embodiments of the present invention may further comprise at least one elongated flap 42, shown in FIG. 2 and FIG. 4, which dampens or limits airflow and waterflow through the at least one ventilation slit 33. In order to control the airflow and waterflow through the at least one ventilation slit 33, the at least one elongated flap 42 is positioned adjacent the at least one ventilation slit 33. Moreover, the at least one elongated flap 42 is fixed to the outer layer 5, opposite the mesh layer 35. A fixed edge 43 of the at least one elongated flap 42 is fixed across a first edge 34 of the at least one ventilation slit 33. The at least one elongated flap 42 is hingedly connected to the outer layer 5 of the first panel 2, over the at least one ventilation slit 33.

Figure 3:
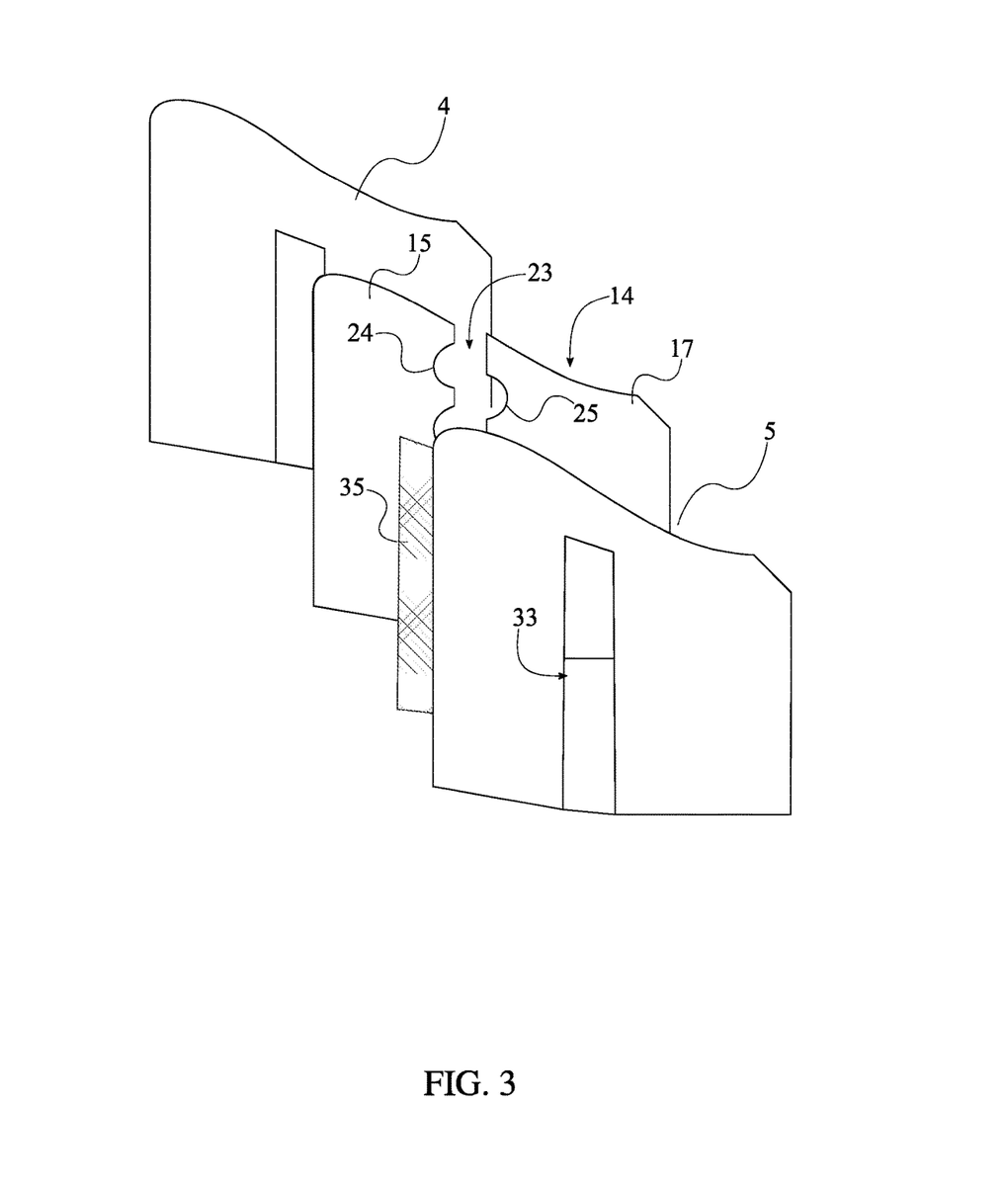
FIG. 3 is an exploded view of a panel and a second buoyant foam layer with at least one second ventilation track oriented parallel with a sagittal plane of a vest of the present invention.

Similar to the at least one ventilation slit 33 and a mesh layer 35 that correspond to the first panel 2, the at least one ventilation slit 33 traverses through the outer layer 5 of the second panel 3 and across the at least one second ventilation track 23. This arrangement is seen in FIG. 1, FIG. 2, FIG. 3, and FIG. 4. In alternate embodiments of the present invention, the at least one ventilation slit 33 traverses through the inner layer 4 as well if the inner layer 4 comprises a less ventilated material, as seen in FIG. 3. The second buoyant foam layer 14 is not displaced within the second panel 3 and through the at least one ventilation slit 33, as the mesh layer 35 is positioned adjacent the at least one ventilation slit 33, between the outer layer 5 and the second buoyant foam layer 14, as seen in FIG. 3. More specifically, the mesh layer 35 traverses across the at least one ventilation slit 33 and is perimetrically connected around the at least one ventilation slit 33.

In order to dampen or limit airflow and waterflow through the at least one ventilation slit 33 corresponding to the second panel 3 and through the at least one second ventilation track 23, the at least one elongated flap 42 is positioned adjacent the at least one ventilation slit 33, shown in FIG. 2 and FIG. 4 Moreover, the at least one elongated flap 42 is fixed to the outer layer 5, opposite the mesh layer 35. A fixed edge 43 of the at least one elongated flap 42 is fixed across a first edge 34 of the at least one ventilation slit 33. The at least one elongated flap 42 is hingedly connected to the outer layer 5 of the second panel 3, over the at least one ventilation slit 33.

Although the invention has been explained in relation to its preferred embodiment, it is to be understood that many other possible modifications and variations can be made without departing from the spirit and scope of the invention as hereinafter claimed.

What is claimed is:

1. A ventilated life jacket comprises:
a vest;
a first buoyant foam layer;
a second buoyant foam layer;
at least one first ventilation track;
at least one second ventilation track;
a plurality of harnesses;
the vest comprises a first panel and a second panel;
the first panel and the second panel each comprises an inner layer and an outer layer;
the first panel being terminally positioned adjacent a first lateral edge of the vest;
the second panel being positioned adjacent a second lateral edge of the vest, opposite the first panel;
the inner layer traversing across the outer layer;
the inner layer being perimetrically connected to the outer layer;
the first buoyant foam layer being positioned within the first panel, between the inner layer and the outer layer;
the second buoyant foam layer being positioned within the second panel, between the inner layer and the outer layer;

the first lateral edge being removably attached to the second lateral edge with the plurality of harnesses;

the at least one first ventilation track traversing through and across the first buoyant foam layer;

the at least one second ventilation track traversing through and across the second buoyant foam layer;

the at least one first ventilation track and the at least one second ventilation track comprises a plurality of first holes and a plurality of second holes;

the first buoyant foam layer and the second buoyant foam layer each comprises a first portion and a second portion;

a first edge of the first portion being positioned adjacent a second edge of the second portion;

the second edge traversing along the first edge;

the plurality of first holes traversing through the first portion;

the plurality of first holes being distributed across the first edge;

the plurality of second holes traversing through the second portion; and the plurality of second holes being distributed across the second edge.

2. The ventilated life jacket as claimed in claim 1 comprises:
each of the plurality of first holes being aligned with a corresponding hole of the plurality of second holes.

3. The ventilated life jacket as claimed in claim 2 comprises:
a first end of each of the plurality of first holes being offset with a first end of a corresponding hole of the plurality of second holes.

4. The ventilated life jacket as claimed in claim 2 comprises:
the first edge being oriented at an acute angle with a sagittal plane of the vest.

5. The ventilated life jacket as claimed in claim 2 comprises:
the first edge being oriented parallel with a sagittal plane of the vest.

6. The ventilated life jacket as claimed in claim 1 comprises:
the first buoyant foam layer comprises a plurality of portions;
the at least one first ventilation track being a plurality of first ventilation tracks;
each ventilation track of the plurality of first ventilation tracks traversing through a portion and an adjacent portion of the plurality of portions;
each ventilation track of the plurality of first ventilation tracks traversing along a first edge of a portion and a second edge of an adjacent portion of the plurality of portions; and,
the plurality of first ventilation tracks being oriented parallel with each other.

7. The ventilated life jacket as claimed in claim 1 comprises:
the second buoyant foam layer comprises a plurality of portions;
the at least one second ventilation track being a plurality of second ventilation tracks;
each ventilation track of the plurality of second ventilation tracks traversing through a portion and an adjacent portion of the plurality of portions;
each ventilation track of the plurality of second ventilation tracks traversing along a first edge of a portion and a second edge of an adjacent portion of the plurality of portions; and,
the plurality of second ventilation tracks being oriented parallel with each other.

8. The ventilated life jacket as claimed in claim 1 comprises:
the vest further comprises a first shoulder strap, a second shoulder strap, and a back panel;
each harness comprises a belt and a fastener;
the back panel being positioned in between the first shoulder strap and the second shoulder strap;
the back panel being terminally fixed to the first shoulder strap and the second shoulder strap;
the first panel being fixed to the first shoulder strap, opposite the back panel;
the second panel being fixed to the second shoulder strap, opposite the back panel;
the belt traversing across the first panel and the second panel;
a fixed end of the belt being connected across the first panel, adjacent the first lateral edge of the vest;
a free end of the belt being fixed to the second panel, adjacent the second lateral edge of the vest; and,
the fixed end of the belt being engaged to the free end of the belt with the fastener.

9. The ventilated life jacket as claimed in claim 1 comprises, wherein the inner layer is made of mesh material.

10. The ventilated life jacket as claimed in claim 1 comprises, wherein the outer layer is made of nylon material.

11. The ventilated life jacket as claimed in claim 1 comprises, wherein both the first buoyant foam layer and the second buoyant foam layer are made of polyethylene.

12. The ventilated life jacket as claimed in claim 1 comprises, wherein both the first buoyant foam layer and the second buoyant foam layer are made of polyvinyl chloride (PVC) foam.

13. The ventilated life jacket as claimed in claim 1 comprises:
at least one ventilation slit;
a mesh layer;
the at least one ventilation slit traversing through the outer layer of the first panel and across the at least one first ventilation track;
the mesh layer being positioned adjacent the at least one ventilation slit, between the outer layer and the first buoyant foam layer;
the mesh layer traversing across the at least one ventilation slit; and,
the mesh layer perimetrically connected around the at least one ventilation slit.

14. The ventilated life jacket as claimed in claim 13 comprises:
at least one elongated flap;
the at least one elongated flap being positioned adjacent the at least one ventilation slit;
the at least one elongated flap being fixed to the outer layer, opposite the mesh layer;
a fixed edge of the at least one elongated flap traversing across a first edge of the at least one ventilation slit; and,
the at least one elongated flap being hingedly connected to the outer layer of the first panel, over the at least one ventilation slit.

15. The ventilated life jacket as claimed in claim 1 comprises:
- at least one ventilation slit;
- a mesh layer;
- the at least one ventilation slit traversing through the outer layer of the second panel and across the at least one second ventilation track;
- the mesh layer being positioned adjacent the at least one ventilation slit, between the outer layer and the second buoyant foam layer;
- the mesh layer traversing across the at least one ventilation slit; and,
- the mesh layer perimetrically connected around the at least one ventilation slit.

16. The ventilated life jacket as claimed in claim 15 comprises:
- at least one elongated flap;
- the at least one elongated flap being positioned adjacent the at least one ventilation slit;
- the at least one elongated flap being fixed to the outer layer, opposite the mesh layer;
- a fixed edge of the at least one elongated flap traversing across a first edge of the at least one ventilation slit; and,
- the at least one elongated flap being hingedly connected to the outer layer of the first panel, over the at least one ventilation slit.

\* \* \* \* \*